United States Patent [19]
Worrell

[11] Patent Number: 5,729,482
[45] Date of Patent: Mar. 17, 1998

[54] MICROPROCESSOR SHIFTER USING ROTATION AND MASKING OPERATIONS

[75] Inventor: Frank Worrell, San Jose, Calif.

[73] Assignee: LSI Logic Corporation, Milpitas, Calif.

[21] Appl. No.: 550,922

[22] Filed: Oct. 31, 1995

[51] Int. Cl.[6] .................................................. G06F 9/305
[52] U.S. Cl. .................... 364/715.08; 395/564; 395/565
[58] Field of Search ................................. 395/564, 565; 364/715.08, 716

[56] References Cited

U.S. PATENT DOCUMENTS

| | | |
|---|---|---|
| 3,395,396 | 7/1968 | Pasternak . |
| 3,969,704 | 7/1976 | Liebel, Jr. . |
| 3,982,229 | 9/1976 | Rouse et al. . |
| 4,139,899 | 2/1979 | Tulpule et al. ........................ 395/565 |
| 4,396,994 | 8/1983 | Kang et al. . |
| 4,467,444 | 8/1984 | Harmon, Jr. et al. . |
| 4,569,016 | 2/1986 | Hao et al. . |
| 4,653,019 | 3/1987 | Hodge et al. . |
| 4,766,566 | 8/1988 | Chuang . |
| 4,839,839 | 6/1989 | Tokumaru et al. ................ 364/715.08 |
| 4,903,228 | 2/1990 | Gregoire et al. . |
| 5,379,240 | 1/1995 | Byrne ................................. 364/715.08 |
| 5,590,350 | 12/1996 | Guttag et al. ............................. 395/800 |

*Primary Examiner*—William M. Treat
*Attorney, Agent, or Firm*—Townsend and Townsend and Crew LLP; Henry K. Woodward

[57] ABSTRACT

A shifter design which is useful in microprocessors is presented. The shifter can perform the operations of a shift right, shift left and shift right arithmetic in which the sign bit of the shifted data word is replicated into the vacated bit positions caused by the shift to the right. The shifter has a rotation count unit, a rotation unit, a mask decoder unit and a logic unit for high-speed operation and occupies a minimal amount of area in an integrated circuit.

13 Claims, 1 Drawing Sheet

MICROPROCESSOR SHIFTER USING ROTATION AND MASKING OPERATIONS

BACKGROUND OF THE INVENTION

The present invention is related to the field of microprocessor design and, more particularly, to the design of shifter units used in microprocessor.

A common operation in microprocessor design is a shift operation by which the bits of a word are shifted into lower order bit positions (shift right) or into higher order bit positions (shift left). A shifter unit is a troublesome circuit block in a microprocessor due to the large amount of crossing wires, i.e., datapaths, in the unit. This is especially true for modern microprocessors having wide, i.e., 32 bits and more, busses. Prior shifter units in microprocessors included multiplexer circuits with duplicate logic to perform a shift right function and to perform a shift left function. Other shifter units used crosspoint switches which inherently occupy much space on an integrated circuit.

The present invention has the ability for performing three types of shift operations. A shifter according to the present invention can shift right, shift left, and can shift right arithmetic in which the sign bit of the data word to be shifted is replicated into the vacated bit positions caused by the shift to the right. The shifter occupies a minimal area in the integrated circuit comprising the microprocessor and performs its operations in a single clock cycle for high speed operation.

SUMMARY OF THE INVENTION

To accomplish these ends, the present invention provides for a shifter which moves input bits in a word right or left by a specified amount in response to an instruction. The shifter has a rotation count unit, a rotation unit, a mask decoder unit and a logic unit. The rotation count unit receives signals specifying an amount of shift of the input bits right or left by the instruction. In response, the rotation count unit generates rotational control bits. The rotation unit receives the input bits and rotates the input bits by a specified amount responsive to the rotational control bits. The mask decoder unit generates masking bits in response to said rotational control bits. The logic unit, which is connected to the mask decode unit and the rotation unit, combines the masking bits and rotated input bits. The shifter performs these operations in one clock cycle.

DETAILED DESCRIPTION OF PREFERRED EMBODIMENTS

Figure 1:
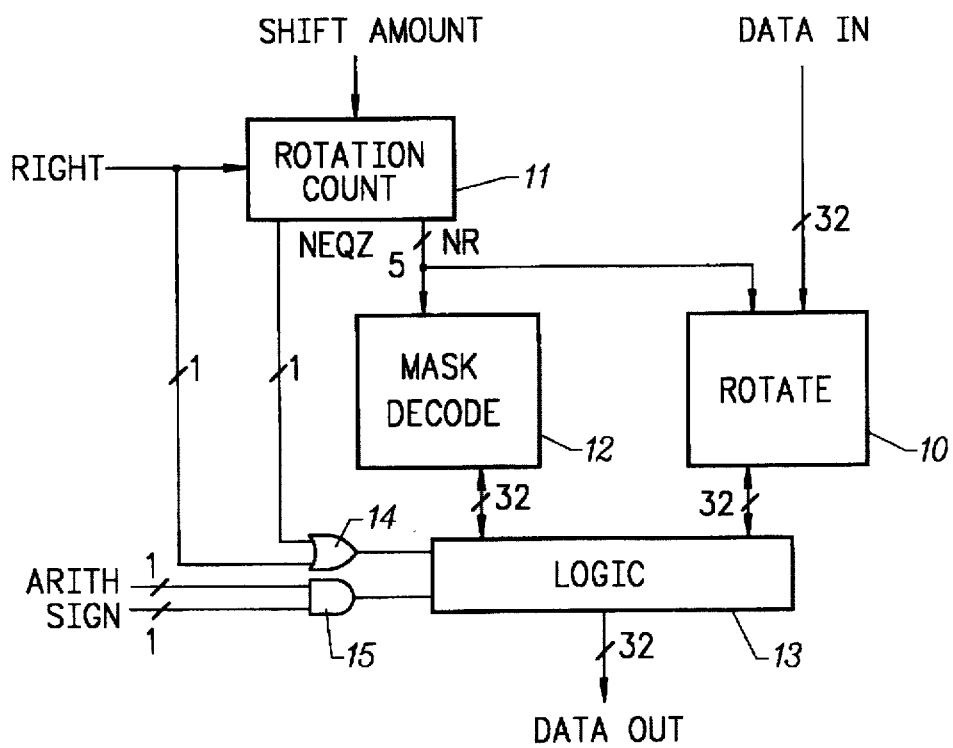
FIG. 1 is a block diagram of a shift unit according to the present invention.

FIG. 1 illustrates the elements and organization of a shifter unit according to the present invention. A 32-bit data word which is to be shifted is received by the rotation block 10. The shift amount, i.e., the number of places by which the bits in the word are to be shifted, are specified in an instruction. The specified shift amount is sent to a rotation count block 11 which generates a 5-bit signal to the rotation block 10. Besides the shift amount signals, the rotation count block 11 receives a control signal which specifies the direction of the shift, right or left. The rotation block 10 rotates only to the right. For shifts to the right, the 5 rotation bits from the rotation count block 11 simply represent the shift count, the shift amount by which the 32-bit word is to be shifted. For shifts to the left, however, the rotation count block 11 generates the rotation bits for a rotate right sufficient to equal the shift to the left specified by the instruction.

The rotation count bits are also received by a mask decoder block 12, which generates a 32-bit word of masking bits. The word of masking bits has logic 0 in all bit positions except for logic 1's which are left-justified. The number of logic 1's is equivalent to the amount of rotation specified by the rotation count block 11. Mask decoder circuits are familiar to integrated circuit designers. A mask decoder circuit which is particular suitable to the implementation of the present invention is described in U.S. application Ser. No. 08/550,944, filed of even date by the present inventor and entitled, "MASK DECODER CIRCUIT OPTIMIZED FOR DATA PATH", now U.S. Pat. No. 5,670,900.

The rotation count block 11 also generates a 0 count signal when the shift amount (and the rotation amount) are 0. The 0 count signal is fed into an OR logic gate 14. The OR logic gate 14 has a second input terminal which also receives the control signal which specifies whether the amount shifted is in the right or left direction. In the present example, a logic 1 signal indicates a shift to the right.

The rotated input bits from the rotation block 10 and the masking bits from the mask decoder block 12 are each fed into a logic block 13. Generally speaking, the logic block 13 performs a bit position by bit position logical combination of the 32 bits from the rotation block 10 and the 32 bits of the mask decoder block 12. The result is a 32-bit data out word which has been shifted according to the computer instruction. The logic block 13 receives the output signal of the OR logic gate 14 as one control signal. The control block 13 also receives the output signal of an AND logic gate 15 as a second control signal. The AND logic gate 15 has one input terminal connected to a line indicative of whether the instruction is an arithmetic operation or not and the second input terminal is connected to a line which carries the sign bit, i.e., the most significant bit of the input data word. The arithmetic operation signal is a logic 1 when the computer instruction specifies an arithmetic operation.

Figure 2:
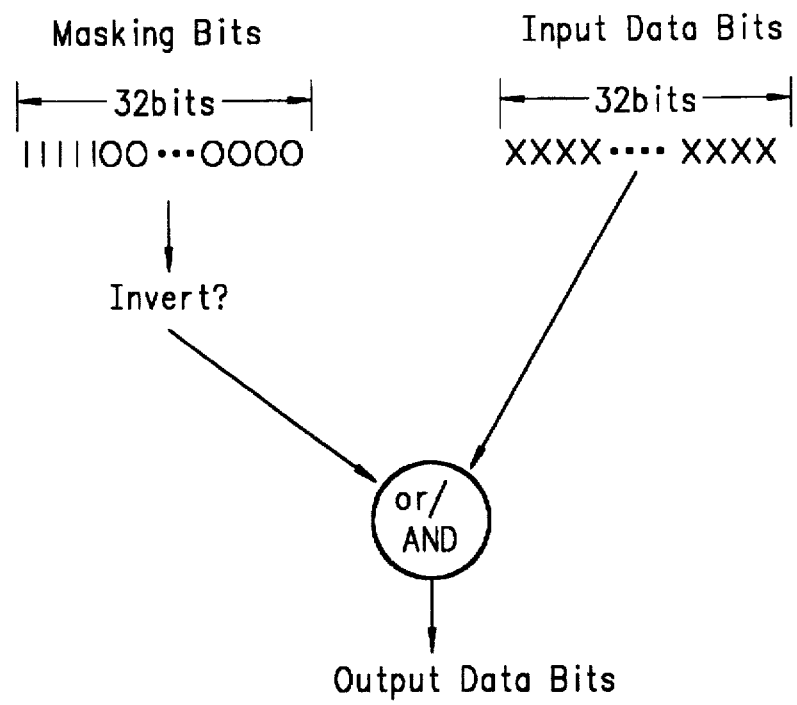
FIG. 2 is a representation of the operation of the logic unit.

The general operation of the shifter unit illustrated in FIG. 1 is illustrated in FIG. 2. The input data bits are sent to the logic block 13 after rotation by the block 10. The 32 masking bits are generated by the mask decoder block 12 in response to the rotation count bits from the rotation count block 11. Depending upon the control signals from the logic gates 14 and 15, the logic block 13 may invert the masking bits and then logically combine them on a bit-by-bit basis with the rotated input data bits. The logical operation can be an OR or an AND operation.

In this manner, a shift right, a shift left, and a shift right arithmetic may be achieved easily. In a shift right, the masking bits are inverted and logically ANDed with the rotated input bits by the logic block 13. The result is that the high order bit places which have been vacated in the shift to the right contain logic 0's.

For a shift left, the masking bits remain uninverted and are logically ANDed with the rotated input data bits. In this case the lower order bit places, which have been vacated by a shift to the left, are filled with logic 0's. Likewise, note that a 0 shift to the left also results in an output data word which matches the input data word. The OR gate 14 handles the special case of shift left by zero. Note that if the shift amount is 0, no shift, the output data word is the same as the input data word, as expected.

Shift right arithmetic with sign bit=0 works exactly as the shift right operations. For the shift right arithmetic with sign bit=1, the masking bits and rotated input bits are logically ORed. Note that all the high order bit places which have been vacated by the shift to the right are filled with logic 1's. In either case, the sign bit has been extended to the vacated bit places in the shift to the right.

While the above is a complete description of the preferred embodiments of the present invention, various alternatives, modifications and equivalents may be used. It should be evident that the present invention is equally applicable by making appropriate modifications to the embodiment described above. Therefore, the above description should not be taken as limiting the scope of invention which is defined by the metes and bounds of the appended claims.

What is claimed is:

1. In a microprocessor a shifter moving input bits in a word right or left by a specified amount in response to an instruction, said shifter comprising a rotation count unit receiving signals specifying an amount of shift of said input bits right or left in said instruction and generating rotational control bits;

a rotation unit receiving said input data bits and rotating said input bits by a specified amount responsive to said rotational control bits;

a mask decode unit responsive to said rotational control bits generating masking bits; and a logic unit connected to said mask decode unit and said rotation unit combining said masking bits and rotated input bits;

said logic unit performing a shift right by performing a logic AND of inverted masking bits and rotated input data bits, said logic unit performing a shift left by performing a logic AND of uninverted masking bits and rotated input data bits, said logic unit performing a shift right arithmetic with a sign bit of zero by performing a logic AND of inverted masking bits and rotated input data bits, and said logic unit performing a shift right arithmetic with a sign bit of one by performing a logic OR of masking bits and rotated input bits, whereby said shifter operates on said input bits in one clock cycle.

2. The shifter in claim 1 wherein said rotation count unit generates a zero count signal when said received signals specify a zero amount of shift.

3. The shifter in claim 2 further comprising a first logic gate responsive to said zero count signal from said rotation count unit and to a signal specifying a right or left direction of said shift, said first logic gate generating an output signal when said amount of shift is zero or in one of said directions.

4. The shifter in claim 3 wherein said one direction of said shift is right.

5. The shifter in claim 1 wherein said mask decode unit generates a word having a number of logic one bits, said number corresponding to said specified amount.

6. The shifter in claim 5 wherein said number of logic one bits is justified left or right in said word.

7. The shifter in claim 6 wherein said logic one bits are justified left in said word.

8. The shifter in claim 1 wherein said rotation unit rotates said input bits in only one direction.

9. The shifter in claim 8 wherein said rotation unit rotates said input bits to the right.

10. The shifter in claim 1 wherein said logic unit inverts said masking bits responsive to said control signals.

11. The shifter in claim 10 wherein said control signals comprise said first logic gate output signal.

12. The shifter in claim 11 wherein said input bits of said word include a sign bit, and said control signals comprise an output signal of a second logic gate, said second logic gate receiving a signal indicative of said sign bit and a signal indicative of an arithmetic operation of said instruction.

13. In a microprocessor a shifter moving input bits in a word right or left by a specified amount in response to an instruction, said shifter comprising means receiving signals specifying an amount of shift of said input bits right or left for generating rotational control bits;

means receiving said input bits for rotating said input bits by a specified amount responsive to said rotational control bits;

means responsive to said rotational control bits for generating masking bits; and a logic unit connected to said masking bit generating means and said rotating means to logically combine said masking bits and rotated input bits;

said logic unit performing a shift right by performing a logic AND of inverted masking bits and rotated input data bits, said logic unit performing a shift left by performing a logic AND of uninverted masking bits and rotated input data bits, said logic unit performing a shift right arithmetic with a sign bit of zero by performinq a logic AND of inverted masking bits and rotated input data bits, and said logic unit performing a shift right arithmetic with a sign bit of one by performing a logic OR of masking bits and rotated input bits, whereby said shifter operates on said input bits in one clock cycle.

* * * * *